United States Patent
Lacey, III

(10) Patent No.: US 6,961,779 B2
(45) Date of Patent: Nov. 1, 2005

(54) SYSTEM AND METHOD FOR ROBUST PARSING OF MULTIPLE-FRAME PROTOCOL MESSAGES

(75) Inventor: Herbert Lyvirn Lacey, III, Garner, NC (US)

(73) Assignee: Globespanvirata, Incorporated, Red Bank, NJ (US)

( * ) Notice: Subject to any disclaimer, the term of this patent is extended or adjusted under 35 U.S.C. 154(b) by 376 days.

(21) Appl. No.: 09/683,762

(22) Filed: Feb. 11, 2002

(65) Prior Publication Data

US 2003/0126270 A1 Jul. 3, 2003

Related U.S. Application Data

(60) Provisional application No. 60/343,189, filed on Dec. 31, 2001.

(51) Int. Cl.$^7$ .............................................. G06F 15/16
(52) U.S. Cl. ...................... 709/232; 709/217; 709/227; 709/228; 709/229; 709/230; 709/231; 709/233; 709/236; 709/237
(58) Field of Search .......................... 709/217, 227–233, 709/236, 237

(56) References Cited

U.S. PATENT DOCUMENTS

| | | | | |
|---|---|---|---|---|
| 5,311,516 | A | * 5/1994 | Kuznicki et al. | ........... 370/314 |
| 5,867,688 | A | * 2/1999 | Simmon et al. | ............ 709/208 |
| 6,453,297 | B1 | * 9/2002 | Burks et al. | .................... 705/3 |
| 6,614,793 | B1 | * 9/2003 | Richards et al. | ....... 370/395.64 |

OTHER PUBLICATIONS

DSL Technology. Where High Speed Data Communications Can Be Provided Over Unshielded Twisted Pair Copper Cable. Aug. 20, 2001 <http://www.telebyteusa.com/dslprimer/dslfull/htm>.

International Telecommunication Union. "Draft New Recommendation G. 994.1—Handshake Procedures for Digital Subscriber Line (DSL) Transceivers—For Approval." Telecommunication Standardization Sector, 1999.

"DSL Technology: Where High Speed Data Communications Can Be Provided Over Unshielded Twisted Pair Copper Cable." *Telebyte Primer* Aug. 29, 2001. May 13, 2002 <http://www.telebyteusa.com/dslprimer/dslfull.htm>.

* cited by examiner

*Primary Examiner*—Nabil El-Hady
(74) *Attorney, Agent, or Firm*—Hunton & Wiliams, LLP

(57) ABSTRACT

A system and method is provided for facilitating robust reception of multiple frame protocol messages. Initially, a first frame of data is received including therein a first segment of a multi-frame protocol message. Next, the received frame is placed into a data buffer. The buffer is then examined and the message contained therein is parsed to determine whether the received message is a complete message or not. If it is determined that the received message contained in the buffer is an incomplete message, a continuation message is sent to the remote transceiver ATU. However, if the message is determined to be complete, the message is parsed again and the complete message information contained therein is extracted and processed in accordance with the handshaking requirements. Upon receipt of the next frame in the message, this frame is concatenated onto the existing frames in the data buffer. The entire buffer is then re-parsed to determine its completeness. If incomplete, the process repeats until a completed message is identified.

15 Claims, 1 Drawing Sheet

SYSTEM AND METHOD FOR ROBUST PARSING OF MULTIPLE-FRAME PROTOCOL MESSAGES

CROSS REFERENCE TO RELATED APPLICATIONS

This application claims the benefit of U.S. provisional patent application Ser. No. 60/343,189 filed Dec. 31, 2001, the disclosure of which is incorporated herein by reference.

BACKGROUND OF THE INVENTION

The present invention relates generally to data processing systems, and in particular, to systems and methods for transmitting and receiving information between such systems across a computer network.

Most modern telecommunications systems utilize some type of modem to package, transmit and receive data a physical medium such as conventional copper telephone lines, fiber optic networks, wireless networks, etc. Generally speaking, a modem is a generic term for any of a variety of modulator/demodulator (hence the term "modem") devices, which, upon transmission, essentially format digital data signals into signals compatible with the type of network being utilized. In the case of conventional telephone modems, a modem operates to modulate a data signal generated by a computer into an analog format compatible with the PSTN (public switched telephone network). Such modulation may be accomplished in any of a variety of manners, dependent only upon the network protocol as well as the bandwidth capability of the physical medium being used. Examples of modulation techniques may include frequency shift keying (FSK), phase shift keying (PSK), differential phase shift keying (DPSK), and quadrature amplitude modulation (QAM). Essentially, these techniques conduct a bitwise conversion of the digital signal into a corresponding analog signal having a frequency related to the original digital value. In a similar manner to the transmission modulation techniques, modems also operate to receive and demodulate signals back into digital formats readable by a receiving terminal.

As the need for higher speed networks has increased, technology has developed which enables conventional networks to surpass the conventional bandwidth limitations of the PSTN network (i.e., a single 3000 Hz signal transmitted between a user and the phone company's nearest central office (CO)). One such technology generating significant interest is Asynchronous Digital Subscriber Line technology or ADSL. Unlike a conventional modem, an ADSL modem takes advantage of the fact that any normal home, apartment or office has a dedicated copper wire running between it and nearest CO. This dedicated copper wire can carry far more data than the 3,000 hertz signal needed for your phone's voice channel. By equipping both the user and the CO with ADSL modems, the section of copper wire between the two can act as a purely digital high-speed transmission channel having a capacity on the order of 10 Mbps (million bits per second). In essence, an ADSL modem operates to utilize the otherwise unused portion of the available bandwidth in the copper lines, i.e., the bandwidth between 24,000 and 1,100, 000 Hz.

Prior to any transmission of actual data between the CO (ATU-C) and the remote computer (ATU-R), the two entities must first undergo a initialization procedure designed to familiarize the two entities with each other, identify the bandwidth capabilities for the current session, and further facilitate the establishment of a valid connection. Pursuant to ADSL standards provided by the International Telecommunication Union—Telecommunication Standardization Sector (ITU-T), these initialization procedures comprise the following: 1) a handshake procedure; 2) a transceiver training session; 3) a channel analysis session; 4) an exchange session; and finally 5) an actual data transmission session referred to as "showtime".

Relating specifically to the handshake procedure, this procedure is designed to enable peer components to initiate a communications session between each other and generally includes the exchange of several specific types of messages having predetermine formats. Examples of such messages include the following: capabilities list and capabilities list request messages; mode select and mode request messages; various acknowledge and negative acknowledge messages, etc. Each of the above messages is generally formulated by a protocol processor responsible for making sure that the requirements for protocol communication are complied with.

In particular, each handshaking message is formatted into at least one frame comprised of an integer number of octets (groupings of 8 bits), and include at least four flag octets, at least one message octet, and a pair of FCS (frame check sequence) octets. Further, the message portion of the frame may include a plurality of octets such that the total number of octets in the frame cannot exceed 64. Messages exceeding 64 octets will necessarily be segmented across multiple frames, although messages of fewer octets may also be segmented. It is the existence of these segmented, multiple-frame messages that forms the focus of the present invention.

In accordance with the handshaking protocol standard, in order to determine whether a received frame is an intermediate frame in a segmented message or the last frame is a segmented message, the receiving unit must continually parse the incoming frames. If the message has not been fully transmitted, the receiving station requests transmission of the next segment. Once a frame has been received as an intermediate frame, there is now a need to store the state result of that frame, pending the next incoming frame.

Accordingly, there is a need in the art of multi-frame protocol messages for a system and method for simply, yet robustly parsing the entire message across multiple frames.

SUMMARY OF THE INVENTION

The present invention overcomes the problems noted above, and provides additional advantages, by providing a system and method for facilitating robust reception of multiple frame protocol messages. Initially, a first frame of data is received including therein a first segment of a multi-frame protocol message. Next, the received frame is placed into a data buffer. The buffer is then examined and the message contained therein is parsed to determine whether the received message is a complete message or not.

If it is determined that the received message contained in the buffer is an incomplete message, a continuation message is sent to the remote transceiver ATU. However, if the message is determined to be complete, the message is parsed again and the complete message information contained therein is extracted and processed in accordance with the handshaking requirements. Upon receipt of the next frame in the message, this frame is concatenated onto the existing frames in the data buffer. The entire buffer is then re-parsed to determine its completeness. If incomplete, the process repeats until a completed message is identified.

Contrary to alternative methods, the present invention does not require the receiving unit to maintain a complex state tracking engine for storing the state information for previously received frames. Rather, all related message frames are concatenated together and maintained in a data buffer until the entire message has been received.

DETAILED DESCRIPTION OF THE INVENTION

Figure 1:
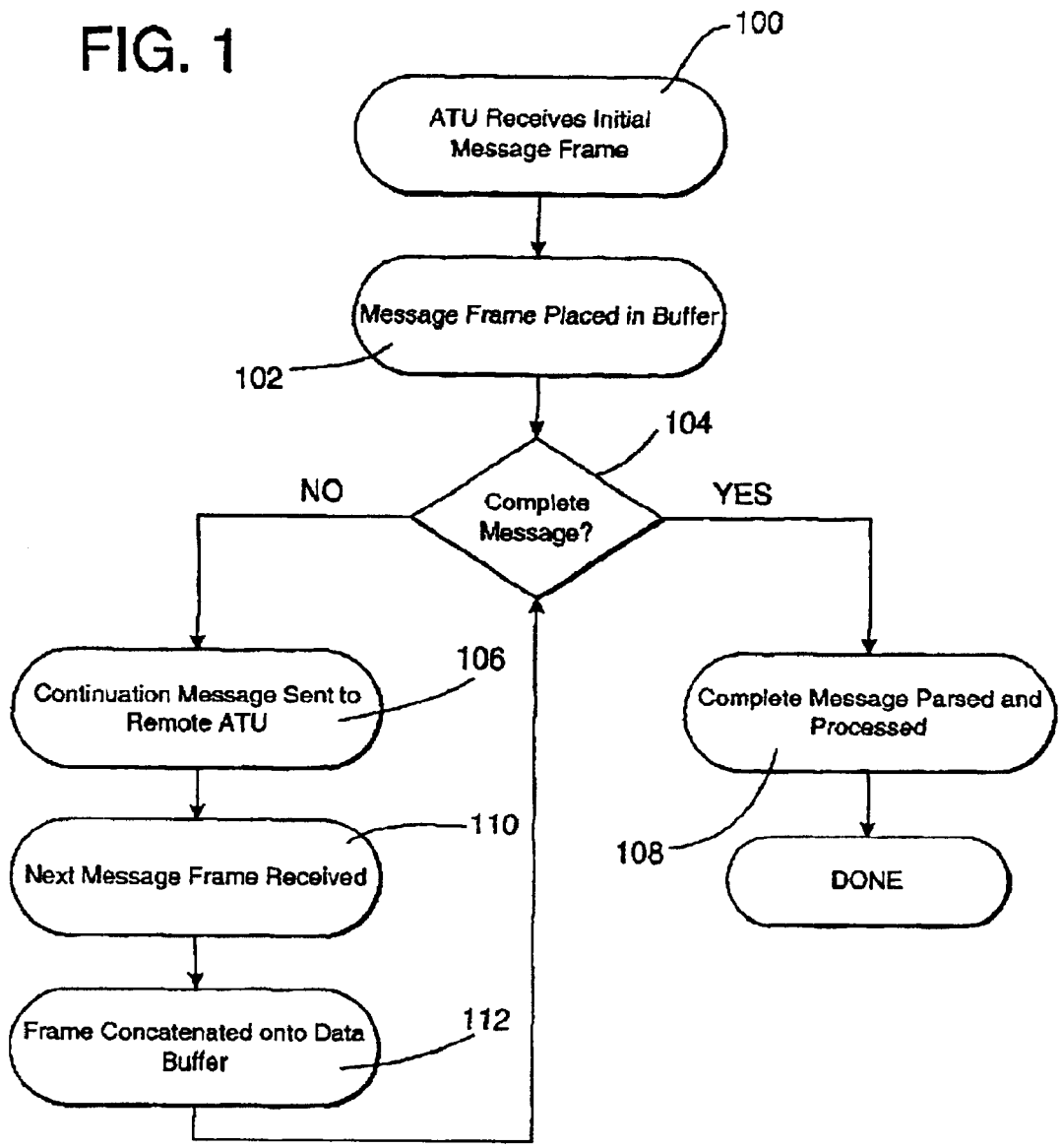
FIG. 1 is a flow diagram illustrating one embodiment of a method for receiving multiple frame messages in accordance with the present invention.

As described briefly above, message octets may be formatted in a variety of manners to include parameters and subparameters relating to particular modes, features or capabilities associated with the two linked ADSL transceiver units (ATU's). In addition, message parameters or subparameters may extend across arbitrary octet boundaries and multiple frames, rendering it difficult for a receiving unit to determine where on message ends and another begins.

As required by the formatting rules provided by the handshaking standards, each parameter octet in the information portion of a message includes a delimiting bit, indicating whether the current octet is the last octet in the block to be transmitted. By using these delimiting bits, the system of the present invention can continually determine whether an a received message is complete without resorting to the use of a complicated state tracking machines which maintains the state of a parsed message pending its completion in multiple frames.

Referring now to FIG. 1, there is shown a flow diagram illustrating one embodiment of a method for receiving multiple frame messages in accordance with the present invention. Initially, in step 100, a receiving ATU receives a first frame of data including therein a first segment of a multi-frame protocol message. In step 102, the receiving ATU places the received frame into a data buffer. Next, in step 104, the receiving ATU examines the buffer and parses the message contained therein and determines whether the received message is a complete message or not. In one embodiment, the receiving ATU operates by counting the number of parameter and subparameter bits in the frame and matches this count to the number of delimiting bits. Since each octet is required to have a delimiting bit indicating whether it completes a message, these bits can be examined to determine message completeness without requiring the actual parsing and interpretation of the message.

If it is determined in step 104 that the received message is incomplete, a continuation message is sent to the remote ATU in step 106. However, if the message is complete, the message is parsed again and the complete message information contained therein is extracted and processes in accordance with the handshaking requirements in step 108. Returning to step 106, upon receipt of the continuation message, the remote ATU sends the next frame in the message which is received in step 110. In accordance with the present invention, this frame is concatenated onto the existing frames in the data buffer in step 112. The process then returns to step 104 where the entire message in the data buffer is again parsed to determine its completeness. The process continues until it is determined that a complete message has been received and does not require the receiving ATU to maintain a complex state tracking engine for previously received frames. Rather, all related message frames are concatenated and maintained in a data buffer until the entire message has been received.

In the manner set forth above, the present invention provides a robust method for parsing protocol messages which may optionally consist of multiple frames, where the messages may be segmented on any arbitrary boundary. Further, the present invention enables a determination of completeness as each frame is received, without limitations of the length of messages, the length of message fields, or sub-fields, or the location of the octet boundaries.

The present invention eliminates the difficulty of designing, developing, and verifying a re-entrant, state-saving parsing engine, which could parse messages frame by frame on the fly if messages were segmented only on major-field boundaries and not on any arbitrary octet boundary. Further, the present invention enables reliable parsing even in the presence of parameters and sub-parameters of arbitrary length (i.e. longer than the maximum frame size), since all related message frames are concatenated together prior to final parsing. It should be noted that the present invention should not be limited to the ADSL handshaking protocol described above. Rather, the invention may be implemented in any system including a protocol which supports message segmentation across multiple frames or packets of data.

While the foregoing description includes many details and specificities, it is to be understood that these have been included for purposes of explanation only, and are not to be interpreted as limitations of the present invention. Many modifications to the embodiments described above can be made without departing from the spirit and scope of the invention.

What is claimed is:

1. A method for parsing multiple-frame protocol messages, comprising the steps of:

receiving a frame of data from a remote ATU, wherein the frame of data contains a segment of a multi-frame protocol message;

inserting the information contained within the received frame into a data buffer;

determining whether the data in the data buffer constitutes a complete message;

extracting the complete message from the data buffer if it is determined that the data in the data buffer does constitute a complete message;

sending a continuation message to the remote ATU if it is determined that the data in the data buffer does not constitute a complete message;

receiving a next message frame from the remote ATU sent in response to the continuation message;

concatenating the information contained within the next message frame onto the data within the data buffer; and determining, based on the concatenated data, whether the data in the data buffer constitutes a complete message.

2. The method of claim 1, further comprising the steps of:

sending a continuation message to the remote ATU if it is determined that the concatenated data in the data buffer does not constitute a complete message; and extracting the complete message from the data buffer if it is determined that the concatenated data in the data buffer does constitute a complete message.

3. The method of claim 1, wherein the step of determining whether the data in the data buffer constitutes a complete message, further comprises the steps of:

counting a number of parameter and subparameter bits within the data buffer; and matching the number of parameter and subparameter bits to a number of delimiting bits contained within the data buffer.

4. The method of claim 1, wherein the step of determining whether the data in the data buffer constitutes a complete message, further comprises the step of parsing the data buffer to determine its completeness.

5. The method of claim 1, wherein the step of extracting the complete message from the data buffer, further comprises the step of parsing the data buffer.

6. A system for parsing multiple-frame protocol messages, comprising:

means for receiving a frame of data from a remote ATU, wherein the frame of data contains a segment of a multi-frame protocol message;

means for inserting the information contained within the received frame into a data buffer;

means for determining whether the data in the data buffer constitutes a complete message;

means for extracting the complete message from the data buffer if it is determined that the data in the data buffer does constitute a complete message;

means for sending a continuation message to the remote ATU if it is determined that the data in the data buffer does not constitute a complete message;

means for receiving a next message frame from the remote ATU sent in response to the continuation message;

means for concatenating the information contained within the next message frame onto the data within the data buffer; and means for determining, based on the concatenated data, whether the data in the data buffer constitutes a complete message.

7. The system of claim 6, further comprising:

means for sending a continuation message to the remote ATU if it is determined that the concatenated data in the data buffer does not constitute a complete message; and means for extracting the complete message from the data buffer if it is determined that the concatenated data in the data buffer does constitute a complete message.

8. The system of claim 6, wherein the means for determining whether the data in the data buffer constitutes a complete message, further comprise:

means for counting a number of parameter and subparameter bits within the data buffer; and means for matching the number of parameter and subparameter bits to a number of delimiting bits contained within the data buffer.

9. The system of claim 6, wherein the means for determining whether the data in the data buffer constitutes a complete message, further comprise means for parsing the data buffer to determine its completeness.

10. The system of claim 6, wherein the means for extracting the complete message from the data buffer, further comprise means for parsing the data buffer.

11. A computer readable medium incorporating instructions for parsing multiple-frame protocol messages, the instructions comprising:

one or more instructions for receiving a frame of data from a remote ATU, wherein the frame of data contains a segment of a multi-frame protocol message;

one or more instructions for inserting the information contained within the received frame into a data buffer;

one or more instructions for determining whether the data in the data buffer constitutes a complete message;

one or more instructions for extracting the complete message from the data buffer if it is determined that the data in the data buffer does constitute a complete message;

one or more instructions for sending a continuation message to the remote ATU if it is determined that the data in the data buffer does not constitute a complete message;

one or more instructions for receiving a next message frame from the remote ATU sent in response to the continuation message;

one or more instructions for concatenating the information contained within the next message frame onto the data within the data buffer; and one or more instructions for determining, based on the concatenated data, whether the data in the data buffer constitutes a complete message.

12. The computer readable medium of claim 11, the instructions further comprising:

one or more instructions for sending a continuation message to the remote ATU if it is determined that the concatenated data in the data buffer does not constitute a complete message; and one or more instructions for extracting the complete message from the data buffer if it is determined that the concatenated data in the data buffer does constitute a complete message.

13. The computer readable medium of claim 11, wherein the one or more instructions for determining whether the data in the data buffer constitutes a complete message, further comprise:

one or more instructions for counting a number of parameter and subparameter bits within the data buffer; and one or more instructions for matching the number of parameter and subparameter bits to a number of delimiting bits contained within the data buffer.

14. The computer readable medium of claim 11, wherein the one or more instructions for determining whether the data in the data buffer constitutes a complete message, further comprise one or more instructions for parsing the data buffer to determine its completeness.

15. The computer readable medium of claim 11, wherein the one or more instructions for extracting the complete message from the data buffer, further comprise one or more instructions for parsing the data buffer.

* * * * *